(12) United States Patent
Stampe

(10) Patent No.: US 10,806,554 B2
(45) Date of Patent: Oct. 20, 2020

(54) ANIMAL CONDITION INDICATION ASSEMBLY

(71) Applicant: David Alan Stampe, Sioux Falls, SD (US)

(72) Inventor: David Alan Stampe, Sioux Falls, SD (US)

( * ) Notice: Subject to any disclaimer, the term of this patent is extended or adjusted under 35 U.S.C. 154(b) by 235 days.

(21) Appl. No.: 16/059,770

(22) Filed: Aug. 9, 2018

(65) Prior Publication Data

US 2019/0105145 A1 Apr. 11, 2019

Related U.S. Application Data

(60) Provisional application No. 62/659,424, filed on Apr. 18, 2018, provisional application No. 62/683,317, filed on Jun. 11, 2018.

(51) Int. Cl.
*A61D 17/00* (2006.01)
*A01K 29/00* (2006.01)
*A01K 11/00* (2006.01)

(52) U.S. Cl.
CPC .......... *A61D 17/002* (2013.01); *A01K 11/006* (2013.01); *A01K 29/005* (2013.01); *A61D 17/004* (2013.01)

(58) Field of Classification Search
CPC .... A61D 17/00; A61D 17/002; A61D 17/004; A61D 17/006; A61D 17/008
USPC .......................................................... 119/174
See application file for complete search history.

(56) References Cited

U.S. PATENT DOCUMENTS

| | | | | |
|---|---|---|---|---|
| 5,542,431 A | * | 8/1996 | Starzl | A61D 19/00 600/551 |
| 6,339,999 B1 | * | 1/2002 | Newell | A61D 17/002 119/174 |
| 6,467,430 B1 | * | 10/2002 | Stampe | A01K 11/00 119/174 |
| 6,708,648 B2 | * | 3/2004 | Stampe | A61D 17/002 119/174 |
| 6,807,680 B2 | * | 10/2004 | Sloot | A01K 11/00 119/857 |
| 8,066,179 B2 | * | 11/2011 | Lowe | A01K 29/00 235/375 |

* cited by examiner

*Primary Examiner* — Richard T Price, Jr.

(57) ABSTRACT

An animal condition indication assembly includes a panel with a plurality of layers. The panel includes a first edge, a second edge, a first lateral edge and a second lateral edge. The layers include an adhesive to be attached to a first animal. A substrate has an upper surface and a lower surface and the adhesive is positioned on the lower surface to adhesively secure the substrate to a rump of the first animal. An intermediate layer is positioned on the upper surface and includes a first color permanently affixed to the substrate. The first color is UV fluorescent. A flood coat is removably positioned on and covers the intermediate layer. Portions of the flood coat are removed by a second animal upon mounting of the first animal by the second animal. The flood coat is opaque and has a different color than the intermediate layer.

16 Claims, 10 Drawing Sheets

ANIMAL CONDITION INDICATION ASSEMBLY

CROSS-REFERENCE TO RELATED APPLICATIONS

I hereby claim the benefit under 35 U.S.C. Section 119(e) of United States Provisional application 62/659,424 filed Apr. 18, 2018 and U.S. Provisional application 62/683,317 filed Jun. 11, 2018.

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC OR AS A TEXT FILE VIA THE OFFICE ELECTRONIC FILING SYSTEM

Not Applicable

STATEMENT REGARDING PRIOR DISCLOSURES BY THE INVENTOR OR JOINT INVENTOR

Not Applicable

BACKGROUND OF THE INVENTION

The disclosure and prior art relates to estrus signaling devices and more particularly pertains to a new estrus signaling device that is more visible in dark conditions than previously used structures. Previous devices, such as those taught in U.S. Pat. No. 6,708,648 incorporated herein by reference, are generally useful for their intended purpose but typically only work well during daylight. When a cattle herd is being observed at night, the devices in the prior art are nearly impossible to see, particularly when the herd is spread out on a large range. Thus, the current device improves upon these devices by incorporating materials which are more easily seen during times of low light.

BRIEF SUMMARY OF THE INVENTION

An embodiment of the disclosure meets the needs presented above by generally comprising a panel including a plurality of layers. The layers include from a bottommost layer to an uppermost layer, an adhesive that is to be attached to a first animal, a bottom color and an intermediate layer. The bottom color comprises a pigment that is UV fluorescent. The adhesive adhesively secures the bottom color to a rump of an animal. An intermediate color removably covers the bottom color. The intermediate color is removed, or worn off, by a second animal upon mounting of the first animal by the second animal. The intermediate color comprises a pigment that is UV fluorescent having a different frequency than a frequency of the pigment of the bottom color.

Another embodiment of the disclosure includes a panel with a plurality of layers. The layers include, from a bottommost layer to an uppermost layer, an adhesive, a substrate, a bottom color and a bottom flood coat. The substrate has an upper surface and a lower surface, wherein the upper surface is white. The adhesive is positioned on the lower surface and adhesively secures the substrate to a rump of a first animal. The bottom color is removably attached to the upper surface and is removed by a second animal upon mounting of the first animal by the second animal. The bottom color comprising a pigment is UV fluorescent and a bottom flood coat is removably positioned on and covering the bottom color, the bottom flood coat is configured for removal by a second animal upon mounting of the first animal by the second animal, the bottom flood coat is colored a first color, the bottom flood coat is opaque.

In another embodiment of the disclosure meets the needs presented above by generally comprising a panel including a plurality of layers. The layers include, from a bottommost layer to an uppermost layer, an adhesive to be attached to a first animal, an intermediate layer and a flood coat. The intermediate layer comprises a first plurality of bands interspersed with a second plurality of bands. The first plurality of bands has a first color, the second plurality of bands has a second color, and the first and second colors are different from each other. The first color comprises a pigment that is UV fluorescent. The first and second colors are non-removable from the panel. A flood coat is removably positioned on and covers the intermediate layer. The flood coat is configured for removal by a second animal upon mounting of the first animal by the second animal. The flood coat is opaque and has a different color than the first and second colors.

In yet another embodiment, the invention includes a panel including a plurality of layers. The panel has a first edge, a second edge, a first lateral edge and a second lateral edge. The layers including from a bottommost layer to an uppermost layer an adhesive, a substrate, an intermediate layer and a flood coat. The adhesive is configured to be attached to a first animal. The substrate has an upper surface and a lower surface. The adhesive is positioned on the lower surface to adhesively secure the substrate to a rump of a first animal. The intermediate layer is positioned on the upper surface and includes a first color and a second color. The first and second colors are imprinted on or embedded in the substrate. The first and second colors are different from each other and form a synthetic pattern that is permanently affixed to the substrate. Only a single one of the first or the second colors comprises a pigment that is UV fluorescent. A flood coat is removably positioned on and covers the intermediate layer. The flood coat is configured for removal by a second animal upon mounting of the first animal by the second animal. The flood coat is opaque and has a different color than the intermediate layer.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF SEVERAL VIEWS OF THE DRAWING(S)

The disclosure will be better understood and objects other than those set forth above will become apparent when consideration is given to the following detailed description thereof. Such description makes reference to the annexed drawings wherein.

DETAILED DESCRIPTION OF THE INVENTION

Figure 1:
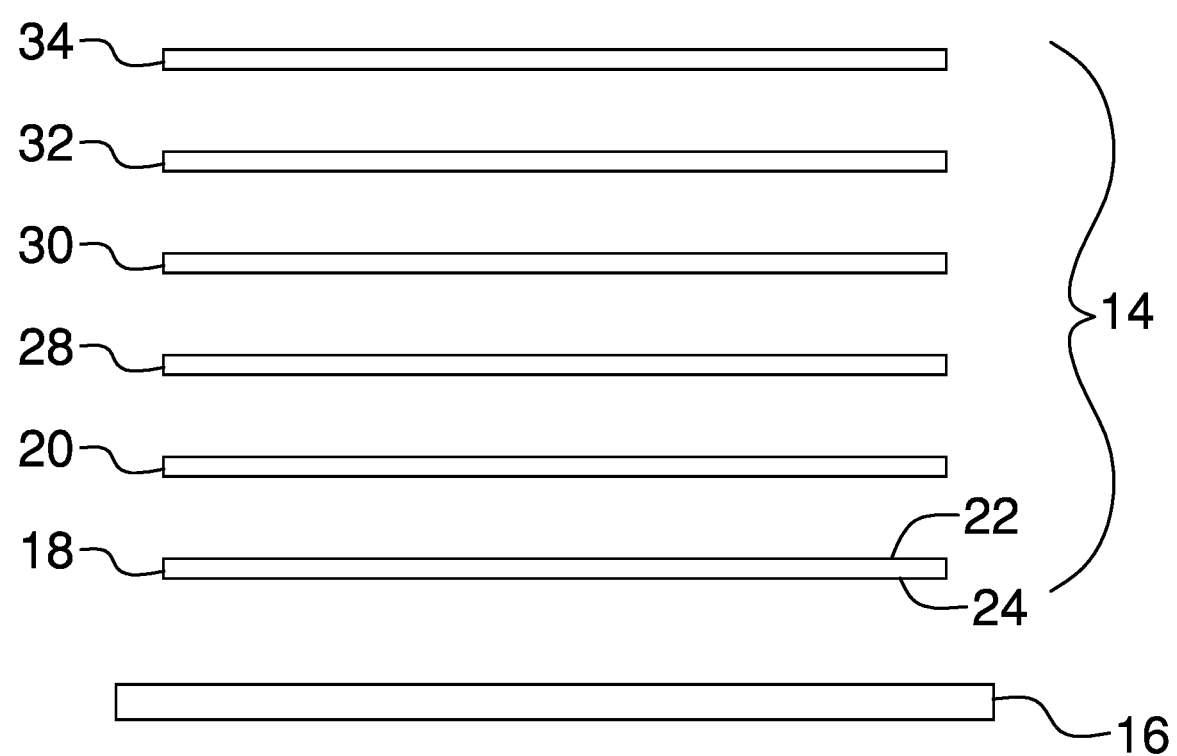
FIG. 1 is a side exploded view of an animal condition indication assembly according to an embodiment of the disclosure.

With reference now to the drawings, and in particular to FIGS. 1 through 6 thereof, a new estrus signaling device embodying the principles and concepts of an embodiment of the disclosure and generally designated by the reference numeral 10 will be described.

As best illustrated in FIGS. 1 through 12, the animal condition indication assembly 10 generally comprises an indicator having a similar structure and which is useful for the some of same purposes as those discussed in U.S. Pat. No. 6,708,648. An embodiment of the assembly 10 shown in FIGS. 1-5 therefore comprises a panel 12, which is flexible, that includes a plurality of layers 14. The layers 14 may include, from a bottommost layer to an uppermost layer, a liner 16, an adhesive 18 and a substrate 20 having an upper surface 22 and a lower surface 24. The adhesive 18 is positioned on the lower surface 24 and is removably attached to the liner 16. It should be noted that the liner 16 need not be considered a "layer" or a part of the panel 12 as it is not utilized during the usage of the assembly 10 outside of preventing the adhesive 18 from unwanted attachments. The adhesive 18 is configured to comprise any suitable pressure adhesive that is readily securable to an animal, and in particular the rump of a cow 80, such that it is not easily removed by abrasion against another animal or by weather elements. The liner 16 may comprise conventional non-stick material used with pressure sensitive adhesives. The upper surface 22 may be white and easily visible under visible light, such as would be common during periods of daylight. However, it should be understood that the substrate 20 may be colored any color which is readily visible during daylight and may further incorporate UV fluorescent materials that are visible under black light. Some colors visible under white light may include, for example, orange, pink, yellow or green. The liner 16 may be provided as a roll 26 of liner 16 upon which the remaining layers are positioned. The adhesive 18 is thereafter removed from the liner 16 and placed upon the cow 80 with the remaining layer(s) of the assembly 10.

The next layer may include a bottom color 28 that is removably attached to the upper surface 22 and which is configured for removal by a second animal upon mounting of the first animal by the second animal. The removal occurs due to friction between the first and second animals and thus the bottom color 28 is rubbed off. The bottom color 28 comprises a pigment which is UV fluorescent and therefore visible to a person using a black light to cause the pigment to fluoresce. The bottom color 28 may be transparent, or clear, in visible light to allow viewing of the substrate 20 beneath in visible light, i.e. daylight. Therefore, without the black light, the bottom layer 28 would not be visible and the upper surface 22 would instead be visible should the viewer being inspecting the panel with only white light.

Throughout the embodiments described herein, the term "fluorescent" is being used to describe a material having fluorescence when struck by UV light typically emitted by what is known as a black light. Though the pigments will typically fluoresce in a violet/blue shade having a wavelength of between 420 nm and 460 nm, the fluorescence may be emitted in any visible wavelength and embodiments may be offered wherein the wavelength vary greatly for added benefits and detection purposes. Moreover, different wavelengths of fluorescing may be utilized within a single embodiment of the panel 12. However, it should be understood that the materials do not inherently glow but only fluoresce when struck by UV light.

A bottom flood coat 30 is removably positioned on and covers the bottom color 28. The bottom flood coat 30 is configured for removal by a second animal upon mounting of the first animal by the second animal. The bottom flood coat 30 is colored a first color and the bottom flood coat 30 is typically opaque. As the bottom flood coat 30 is rubbed off, the bottom color 28 is exposed so that it can be determined if the first animal, such as a cow, is in estrus. The first color may be any readily discernable color in white light but may, in particular, include orange, yellow, green or pink and will differ from the upper surface 22 color if the upper surface 22 is colored. If the bottom flood coat 30 is the uppermost layer of the panel 12, the bottom flood coat 30 may then be colored black or dark grey.

An intermediate color 32 is removably attached to and covers the bottom flood coat 30. The intermediate color 32 is configured for removal by a second animal upon mounting of the first animal by the second animal. The intermediate color 32 comprises a pigment that is UV fluorescent and which will typically have a different frequency than a frequency of the pigment of the bottom color 28. The term frequency herein is being used to essentially describe different colors of UV fluorescence. Typically the colors will be selected so that they are easily discernable from each other. Colors that may typically be utilized include, for example, reds, blues, oranges, yellows and greens though any color easily identified may be included. During use of the panel 12, patterns are formed by numerous instances of friction on the panel 12 wherein upper layers are first worn away to begin to expose layers below. As more layers are exposed, a handler of the first animal will be provided general information as to how often the cow 80 has been mounted. That is, the more the animal is mounted, the more layers are exposed and larger areas of the higher layers have greater excised areas as opposed to the lower layers. As with the bottom color 28, the intermediate color 32 may be transparent in visible light so that the bottom flood coat 30 will be seen through the intermediate color 32 in white light.

An upper flood coat 34 is removably positioned on and covers the intermediate color 32. The upper flood coat 34 is configured for removal by the second animal upon mounting of the first animal by the second animal. The upper flood coat 34 is colored a second color differing in color from the first color of the bottom flood coat 30 and the upper flood coat 34 may be opaque. However, if the upper flood coat 34 is the uppermost layer of the panel 12, it may be provided in a black or dark grey hue.

The above is one suitable example of the assembly 10 though variations are contemplated which include different combinations and number of UV fluorescent layers, which are typically clear, and flood coat layers that are opaque. As such, one could use a number of UV fluorescent layers or a large number of flood coat layers and one UV fluorescent layer. For example, the assembly 10 may include only multiple UV fluorescent layers, such as two to four UV layers, without intervening opaque flood coats therebetween. Another embodiment may include only the adhesive 18, the UV fluorescent bottom color 28 and the bottom flood coat 30 since the purpose is to facilitate viewing of the wear patterns with a black light and thus only one UV active layer is needed. Alternatively, additional layers may further be added such as a top color of UV fluorescence positioned on the upper flood coat 34 and an outer flood coat positioned on the top color.

While fewer layers, in general, will work as intended for the embodiment of FIGS. 1-5, multiple layers of UV active layers provide more opportunity for a greater number of pattern recognition possibilities and the development of techniques to scan patterns formed through the layers. To this end, each UV fluorescent layer will have a unique color that is not shared with the other UV fluorescent layers. The same will hold true of any layers positioned between the UV fluorescent layers wherein each of these intervening layers has its own unique color. The patterns formed by the friction between the first and second animals may be captured by a camera, in ways similar to facial recognition, to determine if a cow is in estrus and thereafter this information is useful within a system to direct the cow through a predetermined gate, by automated opening or closing of required gates. The usage of UV fluorescent pigments enhances the ability of cameras and people to see these patterns, particularly at night and at distances greater than 100 feet. Though similar to a camera, an industrial controller having an electric eye may be utilized as well for its ability to better control the parameters of detection.

In use, the apparatus 10 of FIGS. 1-5 is utilized to identify when an animal needs to be identified for segregation from a remainder of the herd for a veterinarian or a herdsman to service the animal. There are wide range of reasons that could require this type of sorting including, but not limited to, seasonal behavioral changes, heat cycle status, pregnancy check, toxic puerperal metritis evaluation, reproductive status and estrus check. Moreover, the assembly 10 may be used with automatic drafting wherein, as discussed above, a camera linked to motion sensors and automatic gate systems will direct animals where needed if the camera detects a wear pattern aligned with known wear parameters. After receiving service, another panel may be attached to the animal so that it may be automatically drafted for additional services such as lameness evaluation, mastitis, respiratory issues, insect repellent treatment, dermatitis detection, temperature check, milk fever, cystic ovaries, blood testing, hoof care and scour treatments.

Figure 2:
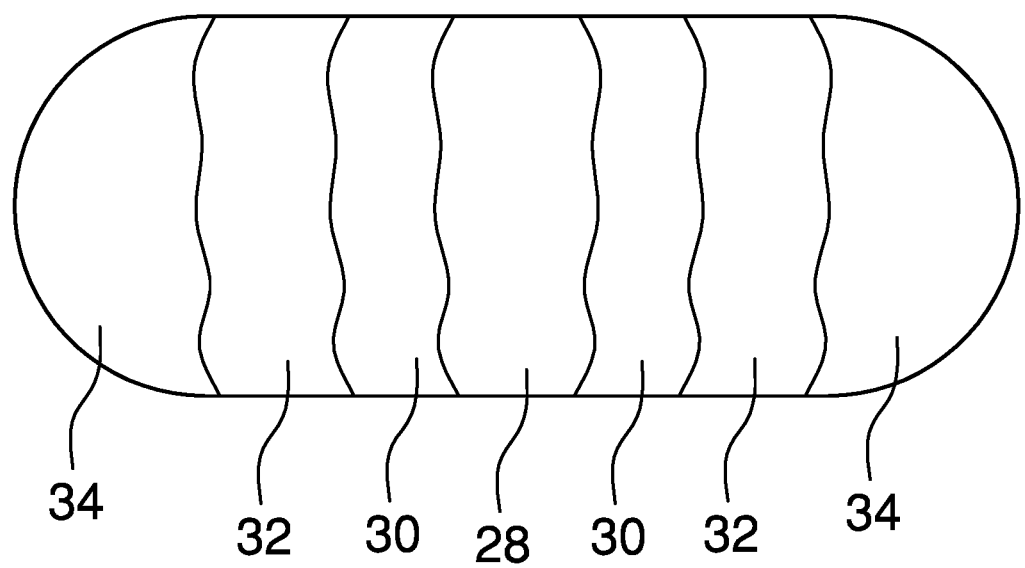
FIG. 2 is a top view of an embodiment shown in FIG. 1 of the disclosure.
Figure 3:
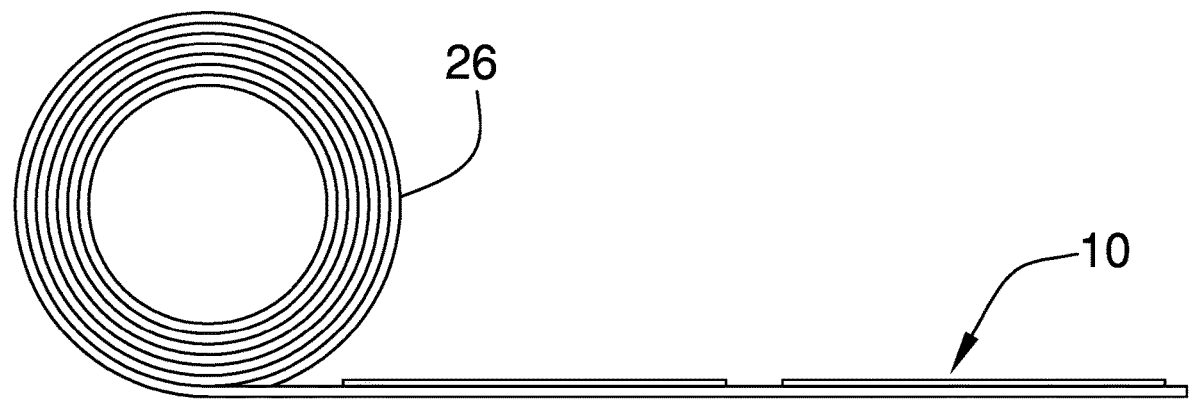
FIG. 3 is a side view of an embodiment of the disclosure.
Figure 4:
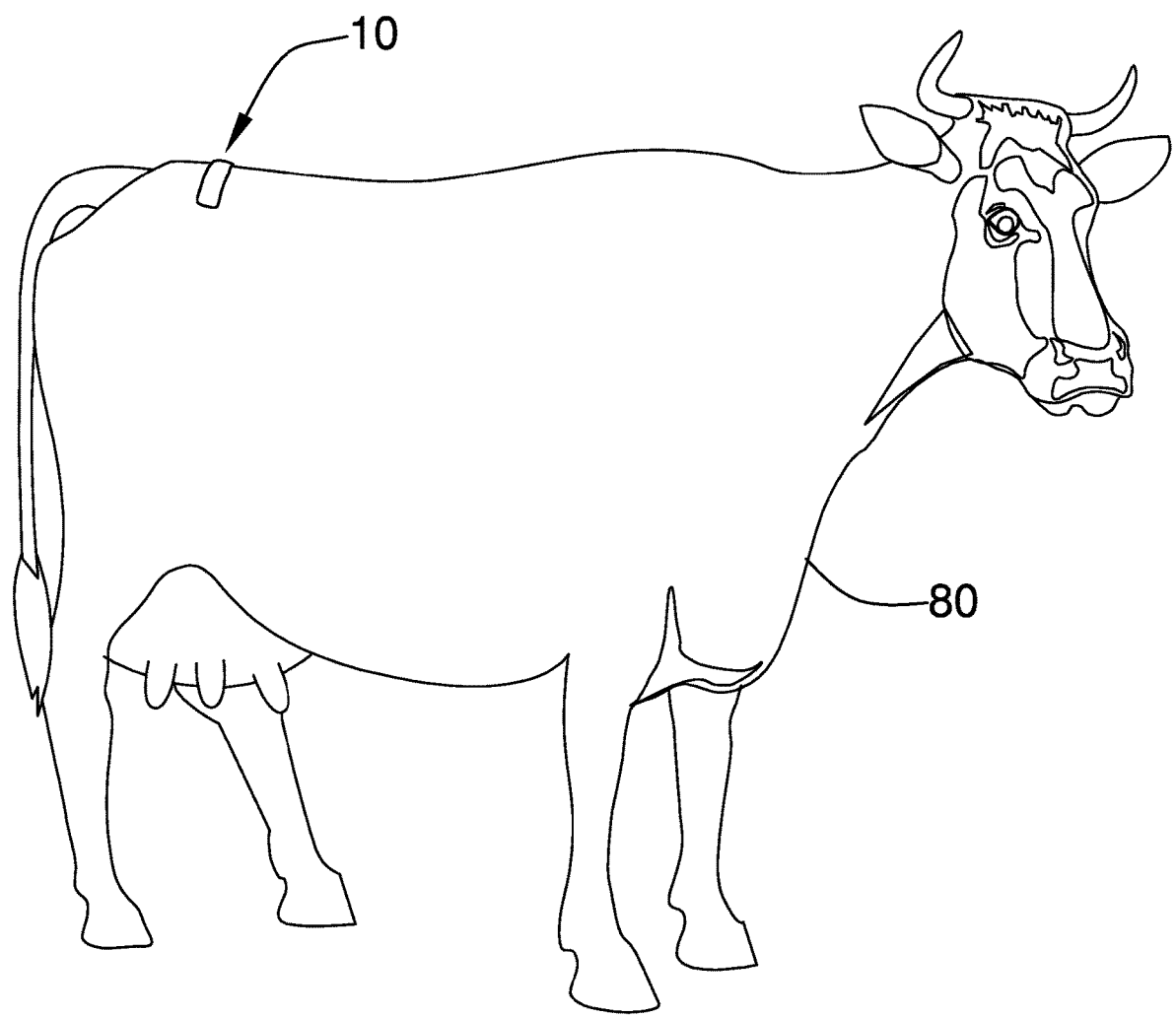
FIG. 4 is a side in-use view of an embodiment of the disclosure.

As an example, if the cow enters estrus, the cow will allow itself to be mounted. Repeated mountings rub layers off of the apparatus so that a wear pattern is formed wherein the upper surface may be visible and bounded by a ring of bottom color 28, which is in turn consecutively bounded by the bottom flood coat 30, and the intermediate color 32 as shown in FIG. 2. The patterns ultimately viewed will, in this way, provide strong insight into the condition of the cow. Because the patterns include UV fluorescent, the patterns will be viewable from long distances, particularly at night, by usage of either handle held or pole mounted black lights. Additionally, cameras may be utilized which can detect and differentiate between UV fluorescence and color reflection from white light to further differentiate between wear patterns.

Figure 5:
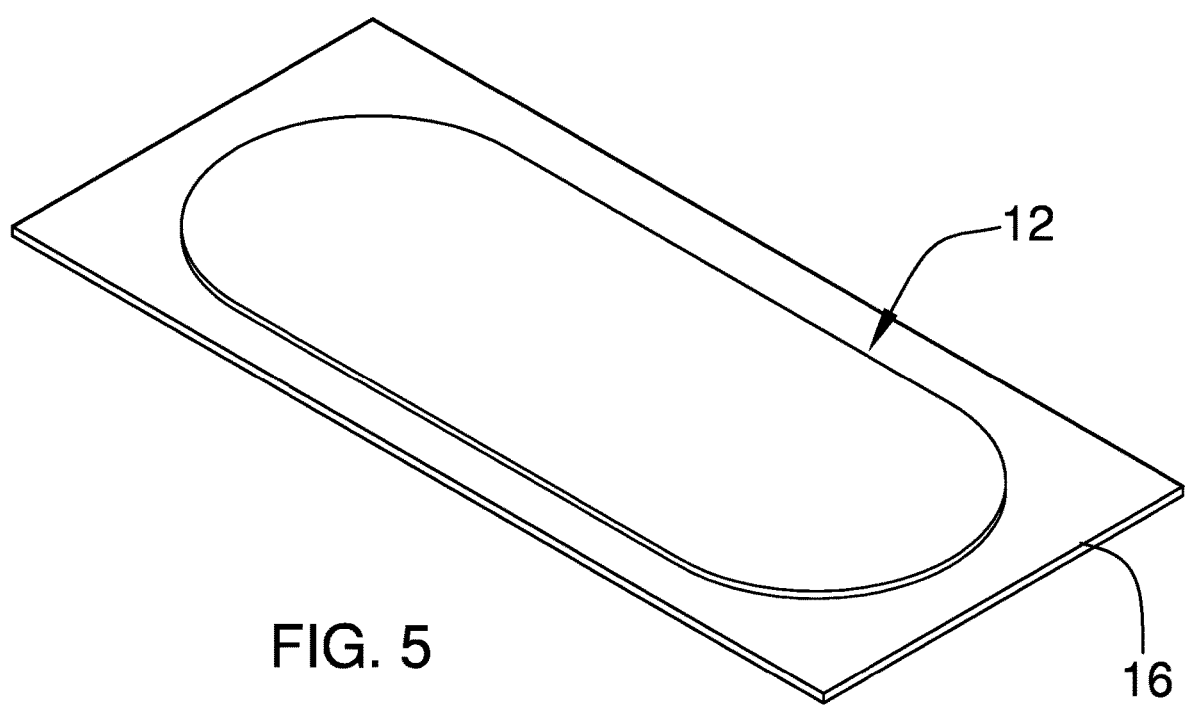
FIG. 5 is a top isometric view of an embodiment of the disclosure.
Figure 6:
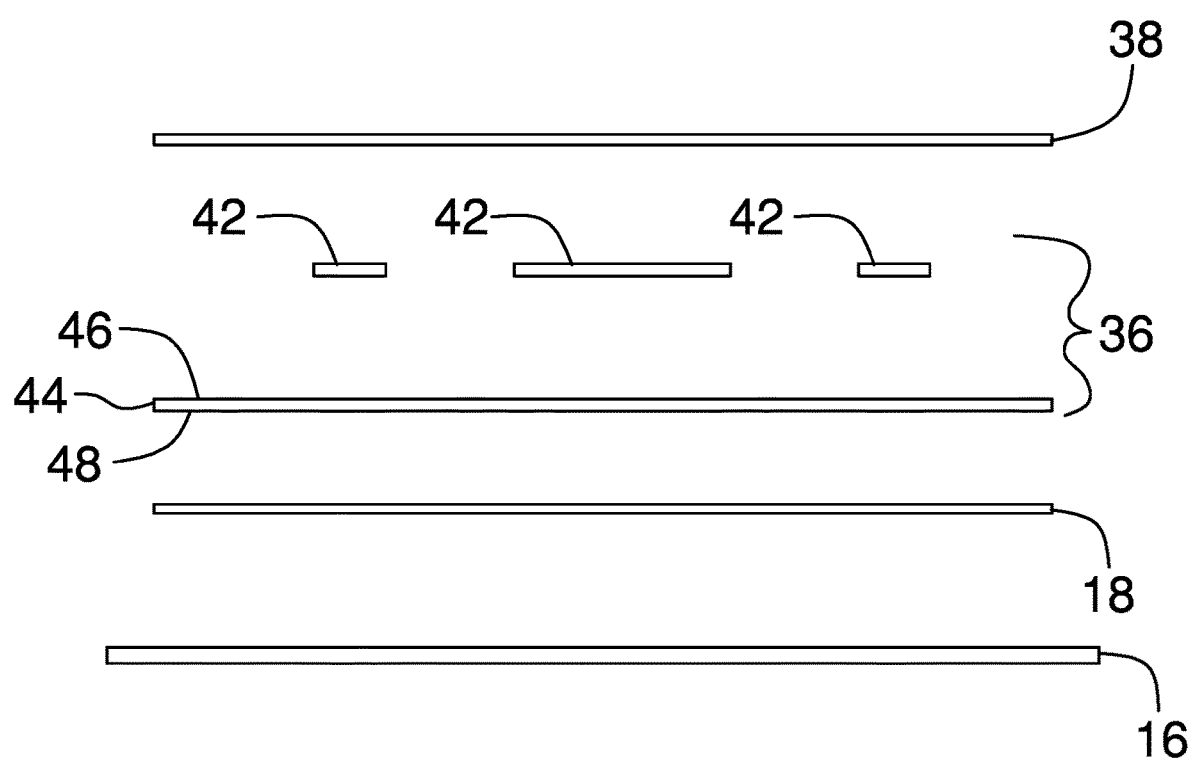
FIG. 6 is a side exploded view of an embodiment of FIG. 6 of the disclosure.

FIGS. 6-9 show another embodiment of the apparatus 10, though FIG. 5 is a generic image that may be utilized for all embodiments herein. In this embodiment, the layers include, from a bottommost layer to an uppermost layer, an adhesive 18, an intermediate layer 36, and a flood coat 38. As with the prior embodiment, further layers and configurations of the above may be supplied and may include, for instance, a liner 16 positioned over a lower side of the adhesive 18 to prevent the adhesive from unwanted adherence to other objects.

The intermediate layer 36 comprises a first plurality of bands 40 and a second plurality of bands 42. The first plurality of bands 40 is interspersed with the second plurality of bands 42. The first plurality of bands 40 has a first color while the second plurality of bands 42 has a second color, wherein the first and second colors are different from each other. More specifically, only a single one of the first or the second colors comprises a pigment that is UV fluorescent. For example, the first color, comprising the first bands 40, may be a UV active pigment whereas the second color, comprising the second bands 42, is not a UV active pigment. The second color may comprise a color that is readily seen during daylight conditions such as orange, pink, yellow, green, red or blue. The first color may be any desired color but the first color may be colored white. The first and second colors are non-removable from the panel 12.

The intermediate layer 36 may be constructed in any number of manners. For example, the intermediate layer 36 may include a substrate 44 having a upper surface 46 onto which the first color is painted, imprinted or impregnated with. The adhesive 18 would be positioned on and cover a lower surface 48 of the substrate. The second bands 42 may then be positioned on the first color so that the first bands 40 are formed between the second bands 42. The second color would be opaque such that the first color would not be visible through the second color. Alternatively, the intermediate layer 30 may have the first and second colors applied by printing or painting to the substrate 18 at the same time such that the first and second colors, and consequently the first 40 and second 42 bands, are the same layer. In another embodiment, the first and second colors may be formed into the substrate itself.

The flood coat 38 is removably positioned on and covers the intermediate layer 36. The flood coat 38 is configured for removal by a second animal upon mounting of the first animal by the second animal. The flood coat 38 is opaque and has a different color than the first and second colors. The flood coat 38 may be colored black or dark grey such that it does not interfere with rapid detection of the first and second colors positioned there below.

Figure 7:
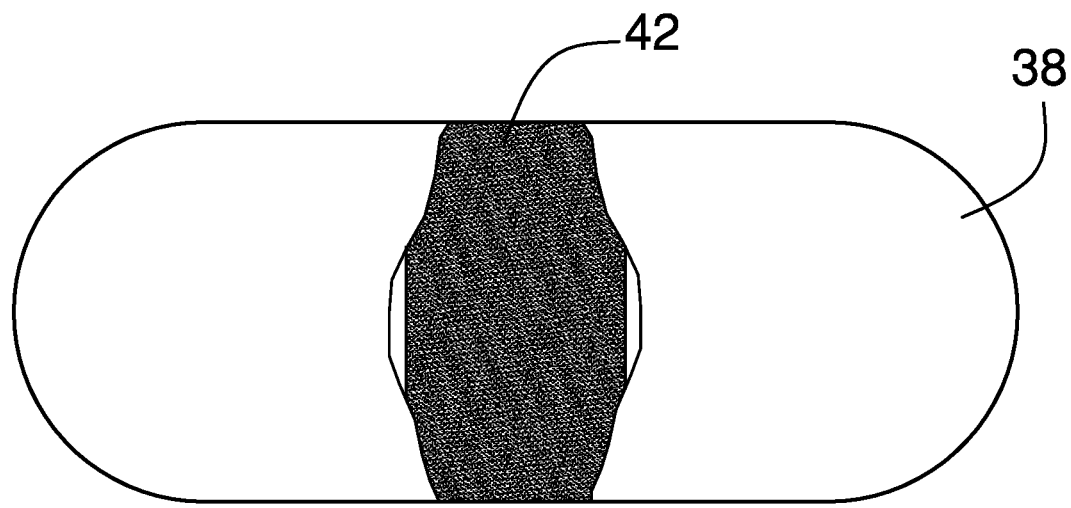
FIG. 7 is a top view of an embodiment of FIG. 6 of the disclosure.
Figure 8:
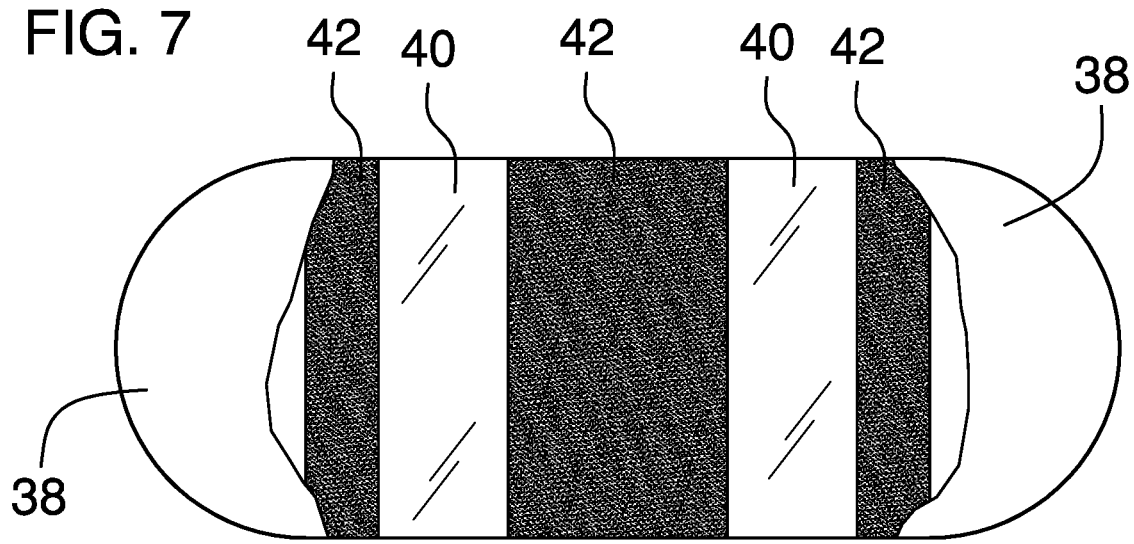
FIG. 8 is a top view of an embodiment of FIG. 6 of the disclosure.
Figure 9:
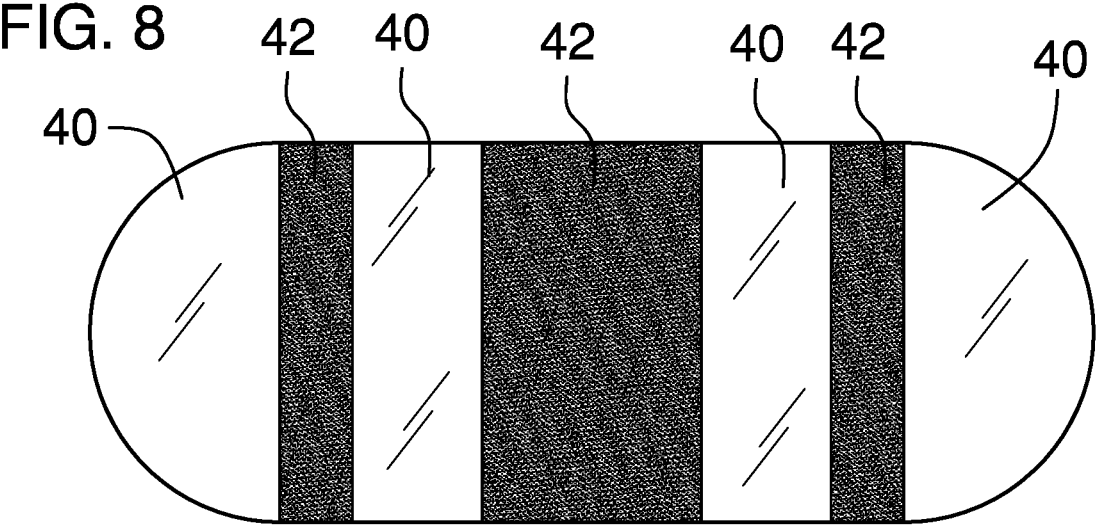
FIG. 9 is a top view of an embodiment of FIG. 6 of the disclosure.
Figure 10:
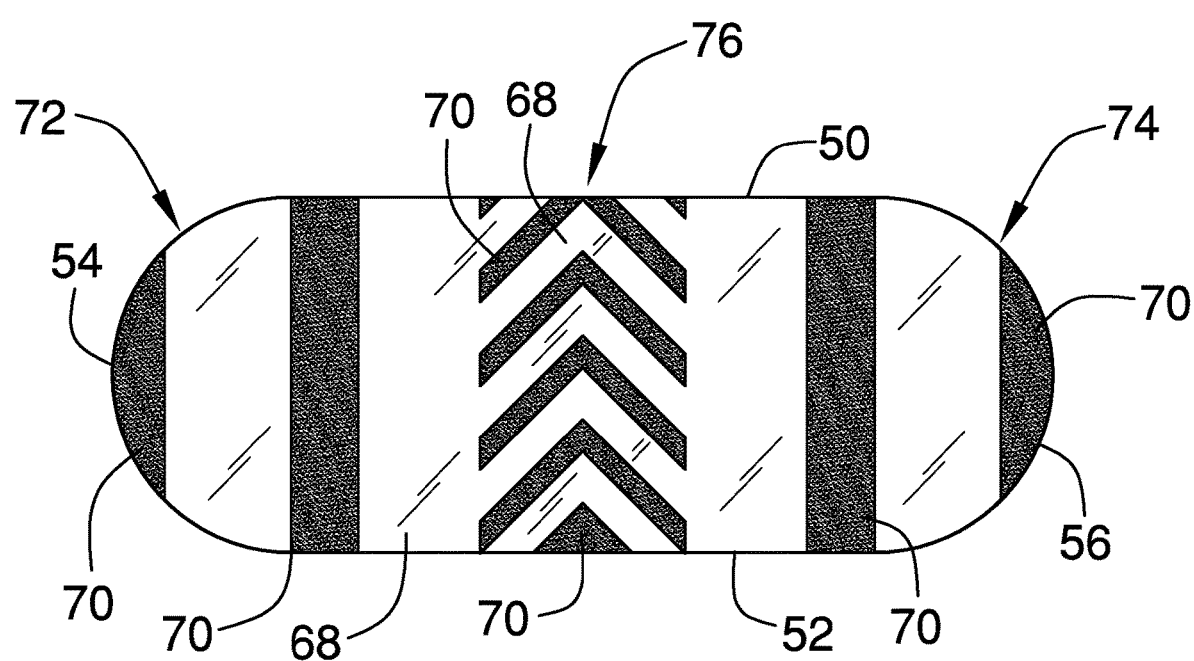
FIG. 10 is a top view of an embodiment of the disclosure.
Figure 11:
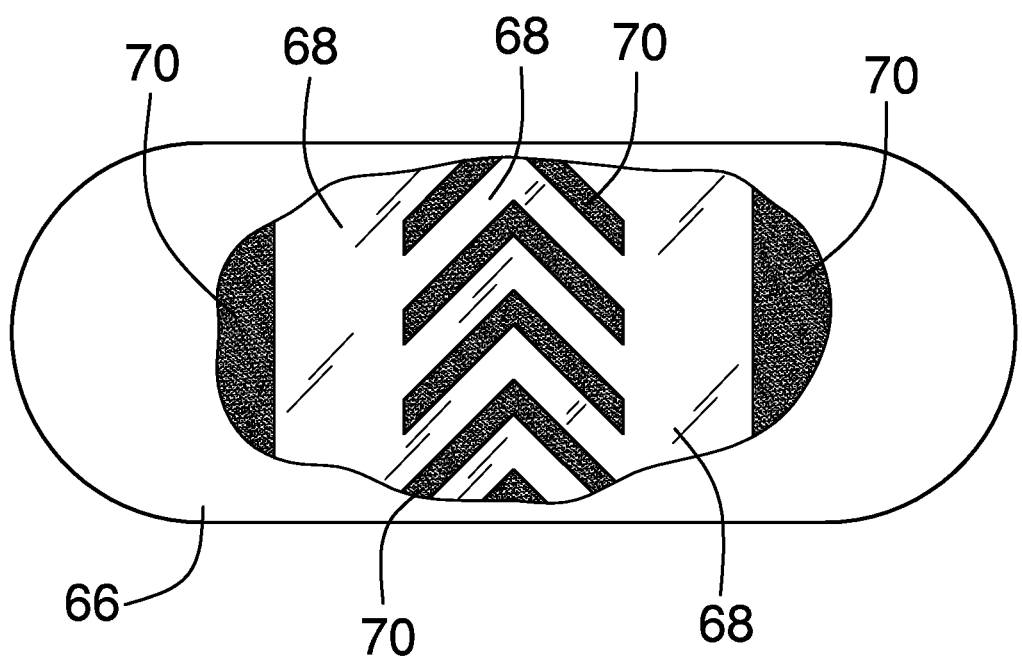
FIG. 11 is a top view of an embodiment of FIG. 10 of the disclosure.
Figure 12:
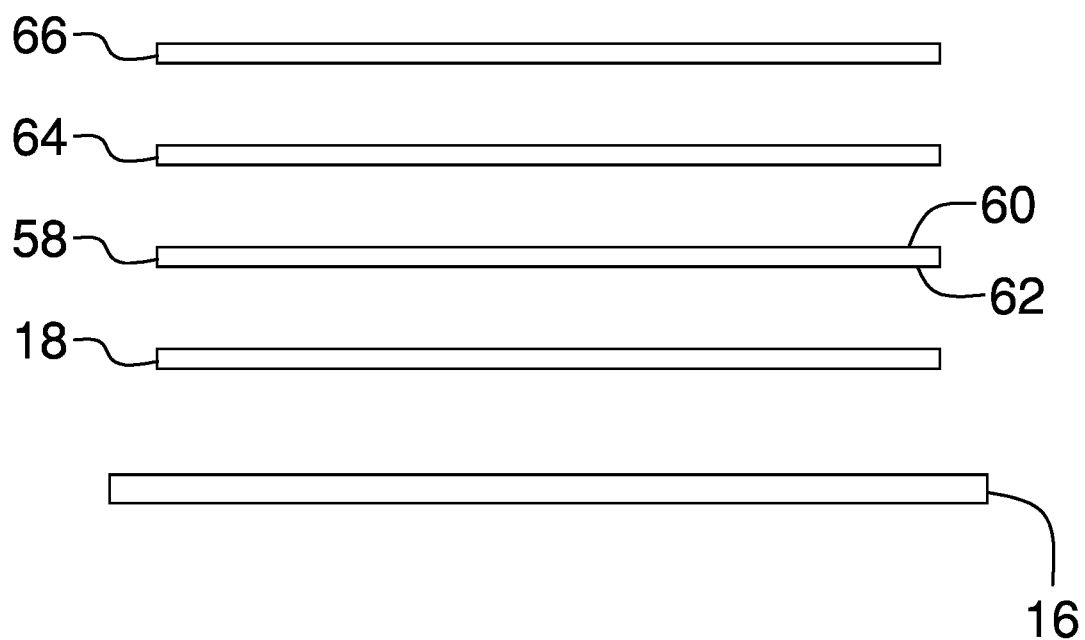
FIG. 12 is a side exploded view of an embodiment of FIG. 10 of the disclosure.

As can be seen in FIGS. 7-9, the first 40 and second 42 bands are interspersed such that they form a pattern that is detected as the flood coat is worn away. The second color, and therefore one of the second bands 42, will be positioned in a central area of the panel 12 such that no UV pigment is noticeable as flood coat 38 is initially worn away. As the first animal is repeatedly mounted, the flood coat 38 wears off outwardly from the central area to the outer, lateral edges of the panel 12. As more flood coat 38 is removed, the first color is noticed which then gives way to the second color again. This pattern provides information as to the cow's estrus cycle so that the cow 80 may be removed from the remainder of the herd, at the proper time, to be inseminated. The patterns formed by the friction between the first and second animals may be captured by a camera, in ways similar to facial recognition, to determine if a cow is in estrus and thereafter this information is useful within a system to direct the cow through a predetermined gate, by automated opening or closing of required gates. The usage of UV fluorescent pigments enhances the ability of cameras and people to see these patterns, particularly at night and at distances greater than 100 feet.

In use, this embodiment is used in a similar manner as the above embodiment to identify when an animal needs to be identified for segregation from a remainder of the herd for a veterinarian or a herdsman to service the animal.

In yet another embodiment of the invention shown in FIGS. 10-12, the panel 12 again includes a plurality of layers and the panel has a first edge 50, a second edge 52, a first lateral edge 54 and a second lateral edge 56. While the shape of the panel 12 includes linear first 50 and second 52 edges and concavely arcuate first 54 and second 56 lateral edges, other shapes may be employed and these designations are used only as reference points to facilitate the elements of the apparatus 10.

The layers of this embodiment again include an adhesive 18 configured to be attached to a first animal and a substrate 58 having an upper surface 60 and a lower surface 62, wherein the adhesive 18 is positioned on the lower surface 62 and is configured to adhesively secure the substrate 58 to a rump of a first animal.

The intermediate layer 64 of this embodiment is positioned on the upper surface 60 and includes a first color 68 and a second color 70. The first 68 and second 70 colors are imprinted on or embedded in the substrate and are permanently affixed to the substrate 58. This may be accomplished by printing one of the colors, such as the first color 68, onto the substrate 58 and then printing the other color, such as the second color 70, onto the other color (first color 68) or both of the first 68 and second 70 colors may be printed on the substrate 58 at the same time. As also mentioned above, the upper surface 60 of the substrate 58 may be manufactured to integrally comprise one of or both of the first 68 and second 70 colors such that a unitary structure is formed.

The first 68 and second 70 colors are different from each other and form a synthetic pattern. As should be understood from the above, the synthetic pattern is permanently affixed to the substrate 58. Only a single one of the first 68 or the second 70 colors comprises a pigment that is UV fluorescent. Though one particular pattern is being described below, the term "synthetic" is defined to indicate a shape, symbol, or other pattern that would typically be easily identifiable and repeatable such that a computer software program used for detecting patterns would normally recognize it as the pattern it is to be seeking. One attributes of the synthetic pattern is that it be direction oriented. That is that it has an "up" direction to better determine where it is located and to better detect any wearing on and around it. Therefore the synthetic pattern will also be generally centrally located on the panel 12 and will include areas of UV fluorescent paint around it to further enhance detection of flood coat 66 removal. Thus, symbols such as letters, arrows, and the like may be used as well as pictographs such as silhouettes of birds, leaves, etc. Essentially, the synthetic pattern may comprise any man-made drawing that is easily distinguishable on a UV fluorescent background.

The synthetic pattern, generally, includes a first lateral section 72 positioned adjacent to the first lateral edge 54, a second lateral section 74 positioned adjacent to the second lateral edge 56 and a middle section 76 positioned between the first 72 and second 74 lateral sections.

The middle section 76 includes the first 68 and second 70 colors laterally extending on the panel and being interspersed with each other from the first edge 50 to the second edge 52. That is, the first 68 and second 70 colors form rows from the first edge 50 to the second 52 edge. The middle section 76 more particularly may comprise stripes each comprising at least two portions intersecting each other at an angle and forming a point directed toward the first edge 50, wherein the angle may be, for example, between 30° and 120°. As can be seen in FIG. 1, the middle section 76 may define a chevron pattern including at least five stripes for reasons which will be discussed below.

The first lateral section 72 and the second lateral section 74 each comprises at least one of the first color 68 and one of the second color 70 that are interspersed with each other and vertically extending from the first edge 50 to the second edge 52. That is, the first 72 and second 74 lateral sections include columns of the first 68 and second 70 colors to deviate from the middle section 76. The first color 68 may be positioned on each side of the middle section 76 and the first color is UV fluorescent. The second color 70 may comprise any color though brighter colors may be beneficial for easy visual inspection by a person.

The flood coat 66 is removably positioned on and covers the intermediate layer 64. As with the other embodiments discussed herein, the flood coat 66 is configured for removal by a second animal upon mounting of the first animal by the second animal. The flood coat 66 is opaque and has a different color than the intermediate layer.

While the general function and usage of this embodiment is the same as those above to detect when an animal is to be segregated, it has been found that using a synthetic pattern allows for quicker identification of the extent of the flood coat removal. That is, specifically, computer recognition software can more easily differentiate between the middle section and the first and second lateral sections as wear occurs. The chevron design is only one that might be used but it has been indicated that including rows having bends or sharp angles are more easily detected by a computer system, particularly when compared to adjacent vertical columns. This combination of rows and vertical columns further enhances the ability to detect a wear pattern and thereby determine the condition of the cow to which it is affixed.

An additional feature of the apparatus may be its inclusion within a system that utilizes strobe lights while imaging the panel 12. Such a strobe light will allow for high quality imaging of the fluorescent colors while remaining dim enough to avoid disturbing the animal on which the panel 12 is attached.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

I claim:

1. An animal health condition indicator assembly configured to be positioned on an animal, the animal health condition indicator assembly comprising:
a panel including a plurality of layers, the panel including a first edge, a second edge, a first lateral edge and a second lateral edge, the layers including from a bottommost layer to an uppermost layer:
an adhesive being configured to be attached to a first animal;
a substrate having an upper surface and a lower surface, the adhesive being positioned on the lower surface and being configured to adhesively secure the substrate to a rump of the first animal;
an intermediate layer being positioned on the upper surface and including a first color and a second color, the first and second colors being imprinted on or embedded in the substrate, the first and second colors being different from each other and forming a synthetic pattern, the synthetic pattern being permanently affixed to the substrate, only a single one of the first or the second colors comprising a pigment being UV fluorescent; and
a flood coat being removably positioned on and covering the intermediate layer, the flood coat being configured for removal by a second animal upon mounting of the first animal by the second animal, the flood coat being opaque and having a different color than the intermediate layer.

2. The animal health condition indicator assembly configured to be positioned on an animal according to claim 1, wherein the synthetic pattern includes a first lateral section positioned adjacent to the first lateral edge, a second lateral section positioned adjacent to the second lateral edge and a middle section positioned between the first and second lateral sections.

3. The animal health condition indicator assembly configured to be positioned on an animal according to claim 1, wherein the middle section includes the first and second colors extending laterally on the panel and being interspersed with each other from the first edge to the second edge.

4. The animal health condition indicator assembly configured to be positioned on an animal according to claim 3, wherein the middle section comprises stripes each comprising at least two portions intersecting each other at an angle and forming a point directed toward the first edge.

5. The animal health condition indicator assembly configured to be positioned on an animal according to claim 4, wherein the angle is between 30° and 150°.

6. The animal health condition indicator assembly configured to be positioned on an animal according to claim 5, wherein the middle section defines a chevron pattern including at least five stripes.

7. The animal health condition indicator assembly configured to be positioned on an animal according to claim 6, wherein the first lateral section and the second lateral section each comprise at least one of the first color and one of the second color and being interspersed with each other and vertically extending from the first edge to the second edge.

8. The animal health condition indicator assembly configured to be positioned on an animal according to claim 7, wherein the first color is positioned on each side of the middle section, the first color being UV fluorescent.

9. The animal health condition indicator assembly configured to be positioned on an animal according to claim 4, wherein the middle section defines a chevron pattern including at least two stripes.

10. The animal health condition indicator assembly configured to be positioned on an animal according to claim 9, wherein the first lateral section and the second lateral section each comprise at least one of the first color and one of the second color and being interspersed with each other and vertically extending from the first edge to the second edge.

11. The animal health condition indicator assembly configured to be positioned on an animal according to claim 10, wherein the first color is positioned on each side of the middle section, the first color being UV fluorescent.

12. The animal health condition indicator assembly configured to be positioned on an animal according to claim 3, wherein the first lateral section and the second lateral section each comprise at least one of the first color and one of the second color and being interspersed with each other and vertically extending from the first edge to the second edge.

13. The animal health condition indicator assembly configured to be positioned on an animal according to claim 12, wherein the first color is positioned on each side of the middle section, the first color being UV fluorescent.

14. An animal health condition indicator assembly configured to be positioned on an animal, the animal health condition indicator assembly comprising:
a panel including a plurality of layers, the panel including a first edge, a second edge, a first lateral edge and a second lateral edge, the layers including from a bottommost layer to an uppermost layer:
an adhesive being configured to be attached to a first animal;
a substrate having an upper surface and a lower surface, the adhesive being positioned on the lower surface and being configured to adhesively secure the substrate to a rump of the first animal;
an intermediate layer being positioned on the upper surface and including a first color being permanently affixed to the substrate, the first color being UV fluorescent; and
a flood coat being removably positioned on and covering the intermediate layer, the flood coat being configured for removal by a second animal upon mounting of the first animal by the second animal, the flood coat being opaque and having a different color than the intermediate layer.

15. The animal health condition indicator assembly configured to be positioned on an animal according to claim 14, wherein the intermediate layer includes a second color removably positioned on and covering the first color.

16. The animal health condition indicator assembly configured to be positioned on an animal according to claim 14, wherein the intermediate layer includes a first plurality of bands and a second plurality of bands, the first plurality of bands being interspersed with the second plurality of bands, the first plurality of bands having the first color, the second plurality of bands having a second color wherein only the first color is UV fluorescent, the first and second plurality of bands being non-removably affixed to the substrate.

\* \* \* \* \*